Figure 1:
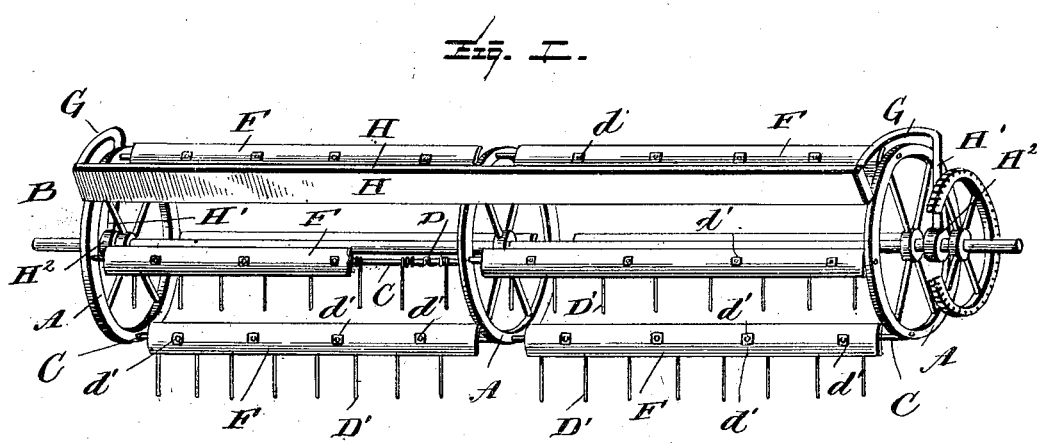

(No Model.)

W. R. MANN.
HORSE HAY RAKE.

No. 481,501.                           Patented Aug. 23, 1892.

Witnesses
L. C. Hills
E. A. Bond

Inventor
William R. Mann,
per Chas. N. Fowler
Attorney ated August 23, 1892.

UNITED STATES PATENT OFFICE.

WILLIAM R. MANN, OF EARLVILLE, ILLINOIS.

HORSE HAY-RAKE.

SPECIFICATION forming part of Letters Patent No. 481,501, dated August 23, 1892.

Application filed April 30, 1892. Serial No. 431,295. (No model.)

*To all whom it may concern:*

Be it known that I, WILLIAM R. MANN, a citizen of the United States, residing at Earlville, in the county of La Salle and State of Illinois, have invented certain new and useful Improvements in Horse Hay-Rakes; and I do hereby declare that the following is a full, clear, and exact description of the same, reference being had to the annexed drawings, making a part of this specification, and to the letters of reference marked thereon.

This invention relates to certain new and useful improvements in horse hay-rakes, and is designed more particularly as an improvement upon the patent, No. 471,648, granted to me March 29, 1892; and it has for its objects, among others, to improve upon the prior construction in certain details of construction, whereby it will perform its work more satisfactorily.

In the prior construction some of the difficulties which have arisen are as follows: The teeth which do the raking are in pairs, made of one piece of spring-wire, which has a loop at its center, which receives a bolt holding the pair of teeth in position. Each tooth has a coil, which passes around the shaft to which the teeth are bolted. The coil is open enough to give freedom of action in the spring. The hay in being discharged at one side of the rake has to pass along a corrugated surface made by these coils, the loops and bolts interfering seriously with its free discharge. Besides, the coils being open allows the hay to be caught in the openings, and thus carried over the reel and left behind on the ground or sometimes winding on the reel, causing annoyance and delay. A head wind drives the hay over the reel at times, also, and in light work the teeth do not fold promptly, and if not folded they strike the frame, injuring both the teeth and the frame. To overcome these difficulties, I have devised, first, a shield, preferably convex in its outer contour, corresponding to the curvature of the circumference of the reel, and secured in position to cover the coils and loops the whole length of each shaft, so that instead of a corrugated surface it is substantially entirely smooth, with openings to catch and carry over the hay, and thus both difficulties are overcome and the raking and discharge are rendered practically perfect. I also provide a windbreaker and tooth-folder, which is arranged the whole length of the reel and rests upon it, being held in position by an arched arm at each end of the said bar and attached to the stem of the boxes in which the reel is journaled and always resting upon it, so that it raises and lowers with it, retaining the same relation or relative position and causing the teeth to fold promptly, also preventing the hay from being carried over by the wind or from any other cause.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 2:
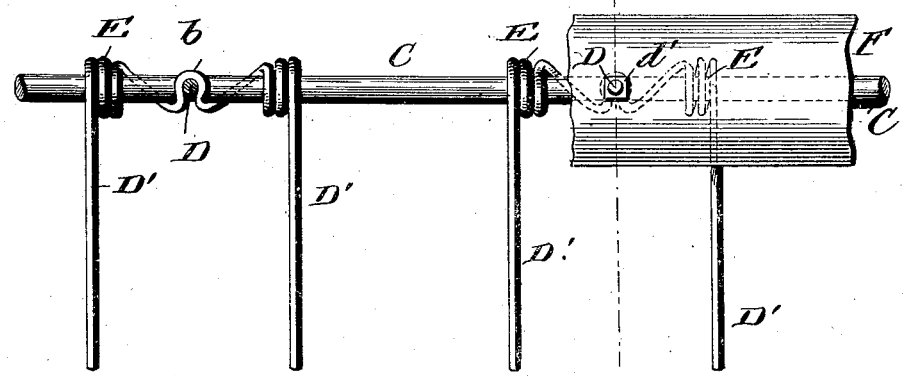
Figure 3:
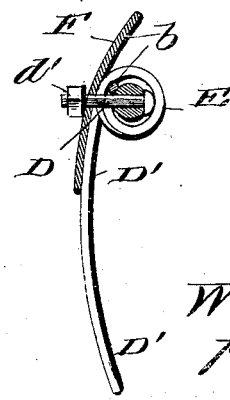

Figure 1 is a perspective of the reel embodying my invention. Fig. 2 is an enlarged detail. Fig. 3 is a cross-section on the line 3 3 of Fig. 2.

Like letters of reference indicate like parts throughout the several views.

Referring now to the details of the drawings by letter, A designates the disks of the reel, and B the shaft, which is designed to be journaled in suitable boxes or bearings and to be operated in the same manner as in my patent before referred to.

C are shafts journaled in the said disks and which carry the rake-teeth. These teeth are in pairs, each pair formed of one piece of spring-wire, which is formed with a loop or eye $b$ at its center, through which passes a bolt or pin D into the shaft to hold the wire D' to the shaft, the bolt being provided with a suitable nut $d'$, as seen in Figs. 2 and 3, the wire being extended in opposite directions from the said eye or loop and coiled around the shaft in any desired number of coils E, the free ends being extended to form the teeth D'.

F is a shield of any suitable material extended the whole length of the shaft, one for each shaft, and preferably secured to the said shaft by the bolts which hold the teeth to the said shaft, as seen in Fig. 3. This shield is convex upon its outer face and may be of any desired width. It will be readily seen from Figs. 2 and 3 how it covers the coils and bolts of the spring-wire teeth.

H is the wind-board and tooth-folder. It is formed of any suitable material, preferably metal, and is held in position by the curved arms G, which in turn are supported by the arms H', which are carried by the bosses or collars H², which are loosely sleeved on the shaft of the reel, as seen in Fig. 1, and is held against displacement by the disks of the reel. This board or wind-breaker serves to prevent the wind from taking the hay over the reel, and at the same time serves to fold the teeth in case they have not folded by the time they reach said board. These attachments aid materially in effecting the desired result and add but slightly to the weight of the reel.

What I claim as new is—

1. The combination, with the reel having pivoted teeth and extensions, of a board arranged to the rear and above the center of the reel and forming a wind-breaker and tooth-folder fixed relatively to the said reel, as set forth.

2. The combination, with a reel provided with rock-shafts carrying the teeth, of a shield over the shafts on which the teeth are supported, as set forth.

3. The combination, with a reel provided with shafts carrying the teeth, of a curved shield supported by the said shaft over the coils of the teeth, as set forth.

4. The combination, with a reel consisting of disks and shafts carrying the teeth, of a curved shield on the shaft over the coils of the teeth and held to the said shaft by the means which secures the teeth thereto, as set forth.

5. A reel provided with pivoted teeth, a shield over its tooth-shaft, and a board forming a combined wind-breaker and tooth-folder fixed relatively to the reel and to the rear and above the center thereof, as set forth.

In testimony that I claim the above I have hereunto subscribed my name in the presence of two witnesses.

WILLIAM R. MANN.

Witnesses:
J. H. CLERUNE,
H. A. CHASE.